United States Patent [19]
Bliss et al.

[11] 3,852,521
[45] Dec. 3, 1974

[54] INTERFACE FOR COMPUTER AND PRINT OUT SYSTEM FOR AUTOMATIC STEP AND LINE SYNC COMMAND TO PRINTER

[75] Inventors: Arthur E. Bliss, Sunnyvale; Philip C. Kenny, Los Altos, both of Calif.

[73] Assignee: Varian Associates, Palo Alto, Calif.

[22] Filed: Dec. 26, 1972

[21] Appl. No.: 318,289

[52] U.S. Cl. ............ 178/5, 178/DIG. 22, 340/172.5
[51] Int. Cl. ..... H04n 5/06, G11b 13/00, G06f 3/12
[58] Field of Search ............ 340/172.5, 324; 178/6, 178/5, DIG. 22

[56] References Cited

UNITED STATES PATENTS

| | | | |
|---|---|---|---|
| 3,558,811 | 1/1971 | Montevecchio et al. | 178/6 |
| 3,582,905 | 6/1971 | Kraatz | 340/172.5 |
| 3,582,936 | 6/1971 | Kite et al. | 340/324 |
| 3,610,902 | 10/1971 | Rahenkamp et al. | 340/172.5 |
| 3,611,301 | 10/1971 | Parks | 340/172.5 |
| 3,618,032 | 11/1971 | Goldsberry et al. | 340/172.5 |
| 3,716,841 | 2/1973 | Jones | 340/172.5 |
| 3,742,288 | 6/1973 | Albrecht et al. | 340/324 AD |
| 3,742,289 | 6/1973 | Kolijmans | 340/172.5 |

*Primary Examiner*—Gareth D. Shaw
*Assistant Examiner*—Paul R. Woods
*Attorney, Agent, or Firm*—Stanley Z. Cole; Paul Hentzel; David Roy Pressman

[57] ABSTRACT

An interface circuit between a computer and a print out system including a stepping paper printer for printing the data received from the computer, the data from the computer being transmitted in the form of separate bytes, each comprising a plurality of bits, a raster scan forming one line of the print out comprising a plurality of said bytes, means being provided for detecting the print out of the last byte of each raster scan and for detecting the receipt of the first byte of the next incoming raster scan and for producing automatically a step command signal to step the printer paper one line and also a line sync command to the write logic of the printer system. A delay signal is also produced to inhibit the writing of the first byte of said next incoming raster until said print out system has responded to said step and line sync commands.

10 Claims, 2 Drawing Figures

INTERFACE FOR COMPUTER AND PRINT OUT SYSTEM FOR AUTOMATIC STEP AND LINE SYNC COMMAND TO PRINTER

BACKGROUND OF THE INVENTION

Printer/plotters, e.g. electrostatic printers with print out on fan-fold or roll paper, capable of printing or plotting, or both simultaneously, responsive to data input and control commands from a programmed computer are in common use. For example, one such printer is capable of printing 132 columns of upper or lower case alphanumeric using 120 characters and symbols across a paper width of about 14 inches at speeds up to 1,000 alphanumeric lines per minute, or will plot with a density of 100 lines per inch across the paper at speeds up to 2.2 inches per second.

Most printer/plotters used with computers are interfaced to accept data over the direct memory access (DMA) channel of the computer. In addition to this data, several commands must be formatted and programmed into the computer for each data transfer in a data-control sequence. Such a sequence comprises connection to the DMA, data transfer for one printer/plotter line, DMA disconnection, command transfer for paper step and line synchronize (carriage return), DMA reconnection, data transfer for the second line, DMA disconnect, step and line synchronize command, etc. These disconnect, connect, and step and line synchronize steps result in a considerable number of software instructions, occupying valuable core space. In addition, these various steps consume the time of the computer when it could be occupied in performing other tasks. Thus, the overall system efficiency is reduced.

SUMMARY OF THE INVENTION

The present invention provides a novel interface circuit between the computer data source and the print out system that operates automatically to produce the step and line synchronize commands after each printed line, eliminating the need for DMA disconnection and reconnection between line scans, thus eliminating most of the commands normally programmed into the computer. The DMA is connected for the entire number of separate data lines to be printed, and the paper step and line sync commands are automatically generated in the interface circuit. Large amounts of data can be tranferred by the computer in an unattended mode of operation. In this manner, memory core requirements, computer instructions, and computer software are significantly reduced and overall system efficiency is greatly increased.

In a preferred embodiment of this invention, the interface circuitry is provided with a novel circuit whereby, on computer command, the interface circuit can be transferred into the automatic step and line sync mode of operation. Thereafter, circuit means sense the print out of the last byte in each separate raster scan and also the receipt of the first byte in the next succeeding raster scan and operate to produce a step command to step the printer paper one line and produce a line sync command to insure the printing of the first byte of said next scan at the start of the next line. After a short time delay to allow the printer to respond, the next raster scan is transmitted to the write circuitry to print this next line. Thus, each step and line sync command between the separate raster scans is produced automatically without command from the computer.

DESCRIPTION OF THE PREFERRED EMBODIMENTS

Figure 1:
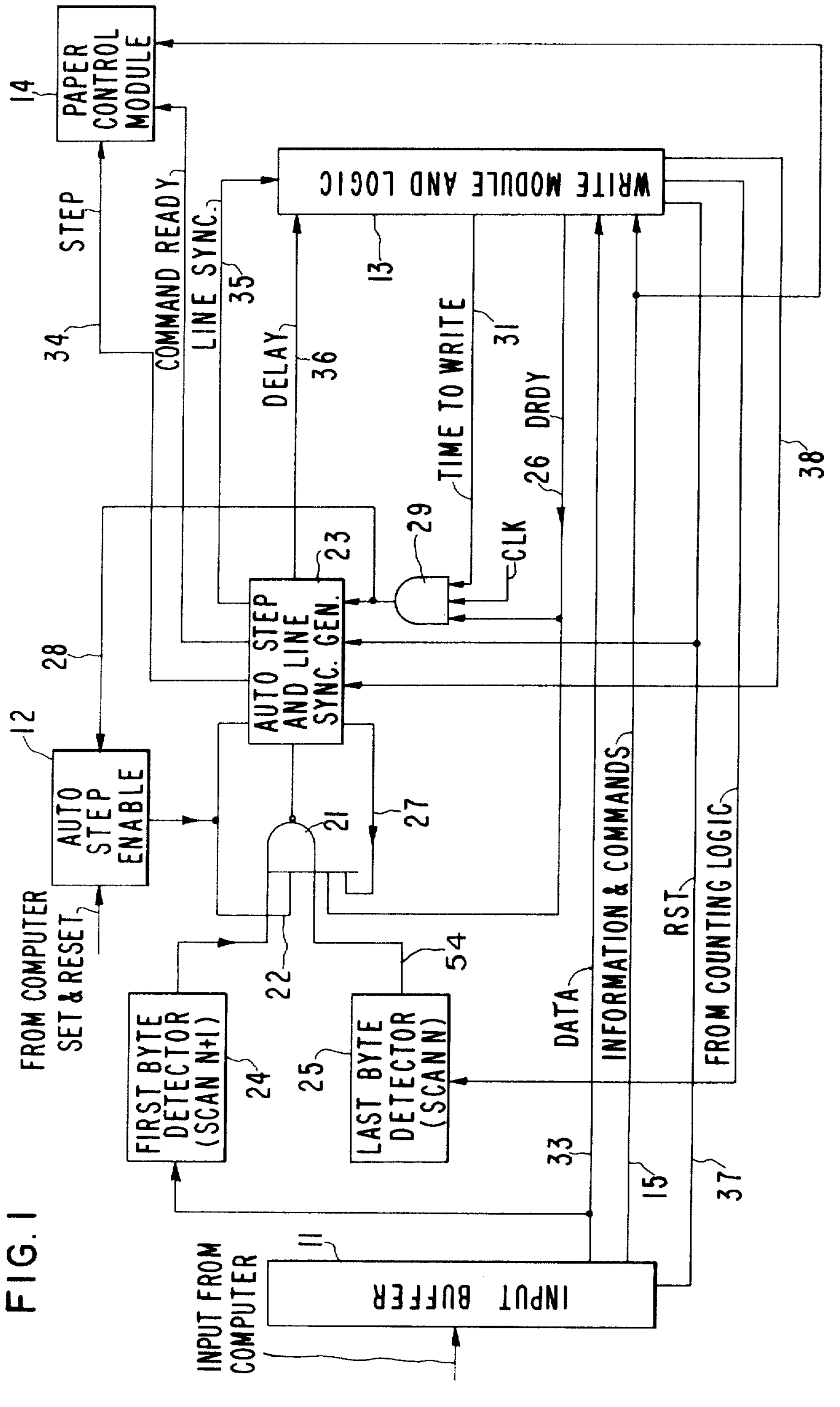
FIG. 1 is a block diagram of the interface circuitry between the computer and the printer embodying the present invention.

Referring now to FIG. 1, the computer output is transmitted into the input buffer stage 11 in normal manner and, when the automatic step enable circuitry 12 is not activated from the computer, the data and control signals to the write module and logic circuit 13 and to the paper control module 14 of the print out system are transmitted directly from the input buffer to the print out system via channel 15. In this mode of operation, the step command for the paper drive and the line sync command for the write logic is included in the program to the computer and the operating sequence comprises the above described step of connection and disconnection of the DMA channel of the computer to the interface, data transfer for one printer/plotter line during the connect interval, and paper step and line sync command during the DMA disconnect. This cycle is repeated for each raster scan, i.e. printed or plotted line which, in our illustration will consist of 176 bytes per raster scan, each byte comprising eight bits. Thus, each raster scan or printed line comprises a total of 176 separate bytes, each of said raster scans being followed by the necessary paper step and line sync command signals. In this mode of operation the computer program must necessarily be more detailed because of the added commands and, even more important, the computer must be devoting its complete attention to the particular data and control signal input to this print out operation.

In those instances in which it is desired to transfer to the automatic step command and line sync signal mode of operation to reduce the programming required to the computer and, more important, to free the computer for other tasks during the interval between raster scans, the computer inputs a set signal to the automatic step enabling circuit 12 which operates to enable the step and line sync NAND gate 21 via input 22. The enable circuit 12 also operates to enable the automatic step and line sync generator circuit 23.

The NAND gate 21 has a plurality of inputs in addition to the enable input 22 including inputs from a first byte detector (scan $n + 1$) 24, a last byte detector (scan $n$) 25, a DATA READY (DRDY) 26 from the write module and logic circuitry 13, and a control input 27 from the step and line sync generator 23.

At the time the step and line sync enable circuit 12 receives the set command from the computer, its output will not go true until a second enable signal is received via input 28 from the control gate 29. The inputs to the control gate 29 include a "time to write" input 31 from the write logic 13. This input goes true when a proper period of time has elapsed to allow all of the prior data to be written by the printer when the set signal is first received by circuit 12 from the computer. In addition, the "data ready" line (DRDY) 26 goes true when the write module 13 has received new data. When these two lines from the write module go true, then the next pulse from the master clock CLK operates the control gate 29 to send the enable signal to the automatic step enable circuitry 12 which operates to place a true on its output. The automatic enable circuit output remains true for so long as the interface circuitry is in the automatic step and line sync command mode of operation as dictated by the computer.

When the 176th byte of each raster (e.g. scan *n*) has been written, the write module and logic circuitry 13 operates to transmit a "last byte detector" signal via circuit 25 to one input of the gate 21. When the first byte of the next raster scan (e.g. scan *n* + 1) has been entered into the input buffer 11, a "first byte detector" signal is generated on DATA line 33 and via the circuit 24 to place a high on the other input to the gate 21. At this time, a high also appears on the input 27 to the gate 21 from the step and line sync generator circuitry 23 such that the output of the gate 21 goes true to the line sync generator circuitry 23 which operates to produce a paper step command signal via line 34 to the paper control module 14 and simultaneously produce a line sync signal via line 35 to the write module and logic circuitry 13. Since the "DATA" true from the input buffer 11 also serves to enable the write logic circuitry 13, a delay signal via line 36 to the write logic is generated by the step and line sync generator 23 to delay acceptance of the input data by the write circuitry of the printer until such time as the step and line sync commands have been accepted and carried out. The acceptance of these commands by the printer circuitry is acknowledged by the return of an RST pulse via line 37 to the step and line sync generator circuitry 23, the sync generator 23 then operating to place a false on the input 27 of the gate 21 to remove the step and line sync command signals from the output thereof. Operation of the sync generator 23 also removes the delay signal 36 to the write logic 13 so that the data in the form of the 176 bytes may be accepted by the printing system for print out of the new line.

Since an RST pulse is created by the write logic 13 to the input buffer 11 to signal acceptance of each separate byte, a "scan complete" signal is generated on line 38 when the input buffer 11 has transmitted the 176th byte of each raster scan to the write module 13 to enable the sync generator circuit 23 to respond to the following RST pulse on line 37 indicating acceptance by the write module of the step and line sync signals.

Figure 2:
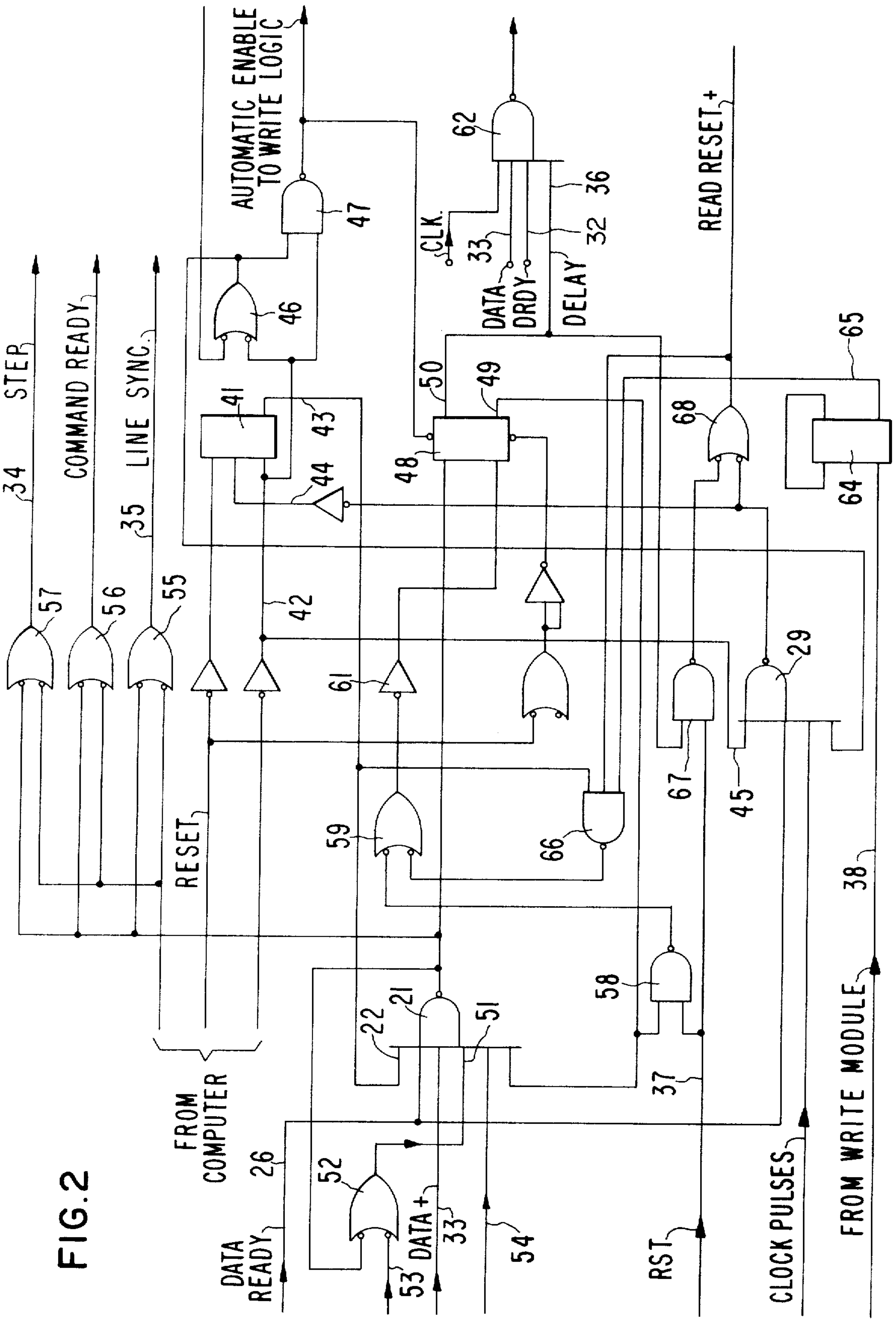
FIG. 2 is a schematic diagram of the novel circuitry for producing the automatic step and line sync signals.

Referring now to FIG. 2 the automatic step enable circuit comprises a flip-flop 41 which receives a set input on line 42 responsive to a computer command when the interface circuit is instructed to transfer into the automatic step and line sync mode of operation. Flip-flop 41, when in the set condition, places a high on the Q output line 43 to one of the inputs 22 of the NAND gate 21 as an enable for this gate. This enable flip-flop 41 will not operate to place a true on its output until such time as a high appears on the input 44 from the NAND gate 29.

One input to the NAND gate 29 is the master clock pulses. A second input 45 to the NAND gate 29 is a true corresponding to the mode selection signal from the computer to the flip-flop 41. A third input to this NAND gate 29 is the DATA READY (DRDY) input 26 from the write logic circuit which, when true, indicates that the write circuitry is ready to receive new data as a result of having processed the preceeding data received by the write circuitry. The fourth input to NAND gate 29 is applied via NOR gate 46 which is operated by a "TMOUT" input from the write logic which, when true, signifies that enough time has elapsed to have allowed all the prior data to be written when the automatic step mode is first initiated. Therefore when the DRDY input is true and a sufficient time has been allowed to permit the printer to have completed its prior process, then the output of NAND gate 29 goes true, operating the flip-flop 41 to place the true enable output on line 43 to the gate 21.

At the time of receipt by gate 46 of the "TMOUT" input, the associated gate 47 operates to set the automatic step control flip-flop 48 so that a high appears on the output 49 and a low appears on output 50. This insures that this control flip-flop 48 is initially set at the beginning of the automatic step mode of operation. The high on the output 49 is transmitted to another of the inputs of the gate 21.

A third input to the gate 21 comprises a true on the DRDY line 26; a fourth input to the gate 21 comprises a latch circuit coupled between the output of gate 21 and one of its inputs 51 including a NOR gate 52. The other input to NOR gate 52 is a paper controller busy input 53, when the paper controller is not busy, i.e. it has completed its prior sequence, a true appears on the input 51 of the gate 21. When a false later appears indicating that the paper controller is busy, the feed back latch circuit will hold this input 51 true until such time as the gate 21 is disabled via input 49 from flip-flop 48. The fifth input to gate 21 is the DATA input 33 which goes high when the first byte of the raster scan *n* + 1 has been entered into the input buffer stage. The final input 54 to gate 21 goes true from the write circuitry signifying that the 176th byte of scan *n* has been written; this true signal is generated by a standard counter included as a part of the writing system.

Therefore, gate 21 serves to operate as a last byte detector of scan *n*, and a first byte detector of scan *n* + 1; with all of its inputs true, the output of gate 21 goes true to serve as an automatic step and line sync command signal. This signal is transmitted via gate 55 to the write logic circuitry to serve as a line sync signal, and to the gates 56 and 57 leading to the paper control module to serve as the step command thereto to cause the paper controller to step the paper one step so that the new incoming raster scan *n* + 1 may be printed on the next line below the previously printed raster scan *n*.

When the line sync signal has been accepted by the write logic circuitry, a true appears on the RST input 37 to gate 58; the other input of this gate 58 is high from the output 49 of flip-flop 48. Thus the output of gate 58 goes true, resulting in an output from gates 59 and 61 to reset the flip-flop 48 and produce a low on the output 49 to gate 21. Gate 21 then operates to place a false on its output and thus terminates the automatic step and line sync command signal. During the period of time of the automatic step and line sync command, the low on the output 50 of flip flop 48 is transmitted to the write logic circuitry and serves as a "Wait" or delay signal for disabling gate 62 which controls initiation of the writing of the first byte of the incoming scan. The DATA input 33 of gate 62 indicates that the first byte of scan *n* + 1 has been entered, and the DRDY true input 32 indicates that the write circuitry is ready to receive new data; therefore the false "Wait" on the other input of gate 62 disables this gate until the enable high is placed on line 50 by operation of the automatic step control flip-flop 48 upon acceptance of the line sync command by a true on RST.

Although RST pulses are produced after each byte has been written by the byte logic circuitry, these RST pulses do not affect gate 58 since the other input is false.

A "scan complete" flip-flop 64 is provided to operate when the last byte of a scan on input 38, i.e. byte 176, has been transmitted to the write module. This "scan complete" signal operates flip-flop 64 to put a high on output 65 to NAND gate 66. A second input to this NAND gate 66 is the high from the enable line 43 of flip-flop 41. Therefore gate 66 responds to the next RST pulse received at the input of gate 67; since the other input of this gate 67 is high from the output 50 of flip-flop 48, gates 67 and 68 operate to place the true on the third input of gate 66. This gate 66 provides a signal via gates 59 and 61 to serve as clock input for flip-flop 48 which then operates as before to place a high on output 49 and a "Wait" on output 50. The high on output 49 to gate 21 then serves to again enable gate 21 so that it may produce another step and line sync command signal. Acceptance of the line sync command in the form of an RST pulse operates as described above to reset flip-flop 48 to terminate the command signal and to enable the write control gate 62.

These automatic step and command signals will be generated after each raster scan has been printed and the first byte of the next raster scan has been entered for so long as the true is applied by the computer to the input of the automatic mode enable flip-flop 41. This novel circuitry therefore permits the computer to dictate whether these command signals will be programmed into and delivered by the computer or whether this interface circuitry will be employed to eliminate such programming and release the computer for other tasks during the step and line sync period of operation of the printer read out system.

What is claimed is:

1. The method for feeding data from a data source to a data print out system including a stepping printer wherein said data is in the form of a plurality of raster scans, each raster scan comprising a plurality of bytes, each byte containing a plurality of bits, each raster scan providing the data print out in a separate line of the print out medium, comprising the steps of detecting the print out of the last byte of raster scan *n*, detecting the receipt of the first byte of raster scan *n* + 1 from said source, and producing a step command and line synchronize signal to the print out system to step the printer line-by-line for each raster scan and to synchronize the initiation of the line printing with the start of each raster scan in response to said two byte detections.

2. The method as claimed in claim 1 including the step of delaying the print out of the first byte of the received raster scan *n* + 1 until the printer has responded to the step and line sync commands.

3. The method as claimed in claim 1 including the step of enabling the detecting of said print out of raster scan *n* and said receipt of the first byte of raster scan *n* + 1 under control of said data source.

4. An interface circuit for use between a data source and a data print out system including a stepping printer wherein data is in the form of a plurality of raster scans, each raster scan comprising a plurality of bytes, each byte containing a plurality of bits, is fed from the source to the print out system, each raster scan providing the data print out in a separate line of the print out medium, comprising means for producing a step command and line sync signal to the print out system to step the printer line-by-line for each raster scan and to synchronize the initiation of the line printing with the start of each raster scan, means for detecting the print out of the last byte of raster scan *n*, means for detecting the receipt of the first byte of raster scan *n* + 1 from said source, and means responsive to said two detecting means for operating said means to produce said step command and line sync signal to said print out system.

5. An interface circuit as claimed in claim 4 wherein said step command and line sync signal are generated by a gate circuit, said gate circuit comprising a plurality of control inputs, one control input responsive to the print out of the last byte of raster scan *n*, a second control input responsive to the receipt of the first byte of raster scan *n* + 1 from said data source, and a third control input responsive to an enable signal generated in response to a command from said data source.

6. An interface circuit as claimed in claim 5 including a fourth control input responsive to a signal from said print out system indicating an ability to receive new data.

7. An interface circuit as claimed in claim 4 including means for disabling said data print out systems such that it does not respond to print out said received first byte of raster scan *n* + 1 until said print out system has responded to said step and line sync commands.

8. An interface circuit as claimed in claim 7 wherein said step command and line sync signal are generated by a gate circuit, said gate circuit comprising a plurality of control inputs, one control input responsive to the print out of the last byte of raster scan *n*, a second control input responsive to the receipt of the first byte of raster scan *n* + 1 from said data source, and a third control input responsive to an enable signal generated in response to a command from said data source.

9. An interface circuit as claimed in claim 8 including a fourth control input responsive to a signal from said print out system indicating an ability to receive new data.

10. An interface circuit as claimed in claim 7 including enabling means responsive to the input from said data source for enabling said step and line sync producing means.

* * * * *